Feb. 19, 1957  V. L. SMITHERS  2,781,902
SPECIAL PACKAGE
Filed Feb. 23, 1954  3 Sheets-Sheet 1

INVENTOR.
VERNON L. SMITHERS
BY
ATTORNEYS

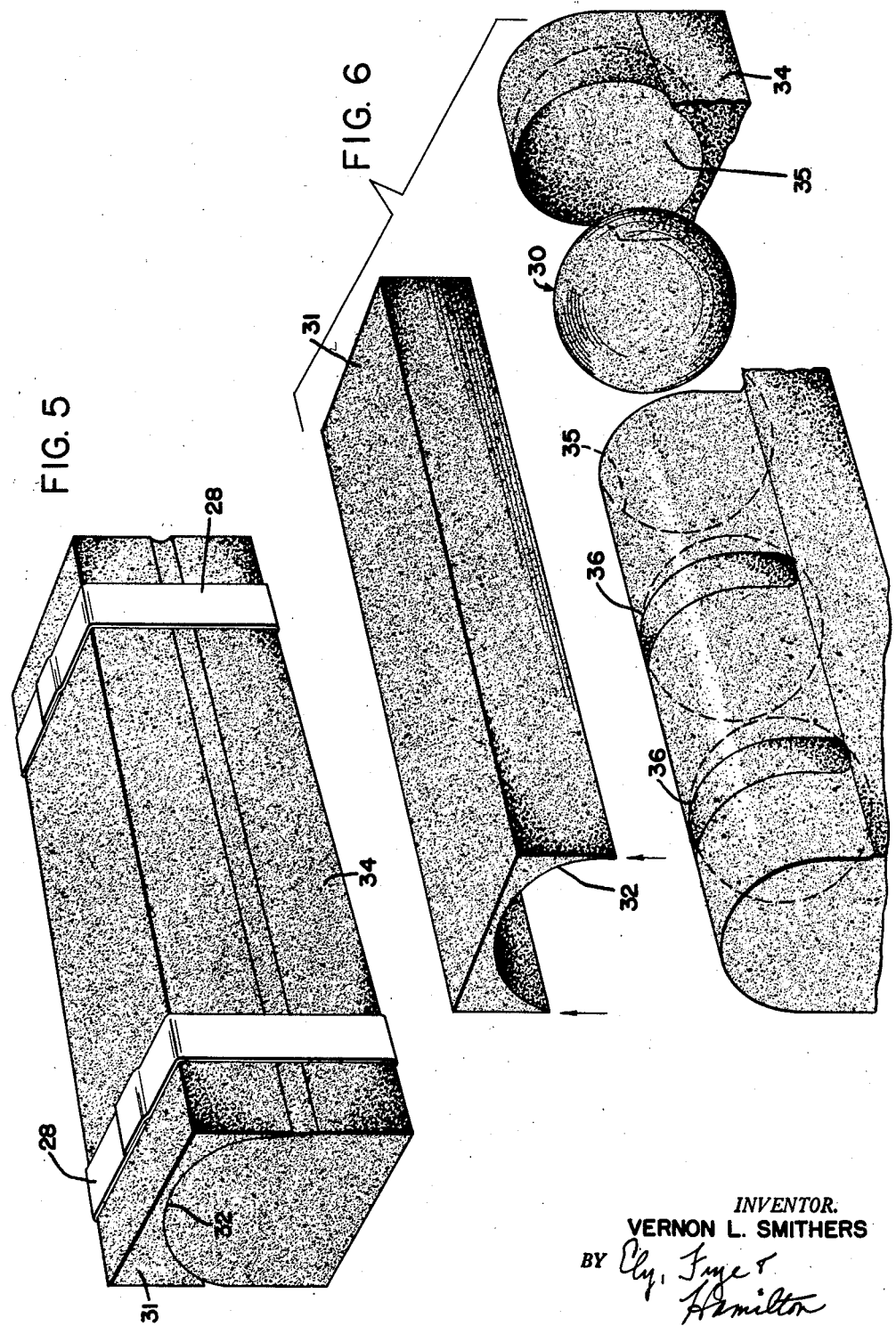

Feb. 19, 1957　　　　V. L. SMITHERS　　　　2,781,902
SPECIAL PACKAGE

Filed Feb. 23, 1954　　　　　　　　　　　3 Sheets-Sheet 3

INVENTOR.
VERNON L. SMITHERS
BY *Ely, Frye & Hamilton*

ATTORNEYS

United States Patent Office 2,781,902
Patented Feb. 19, 1957

2,781,902

SPECIAL PACKAGE

Vernon L. Smithers, Akron, Ohio, assignor to The V. L. Smithers Manufacturing Company, Akron, Ohio, a corporation of Ohio Application February 23, 1954, Serial No. 411,854

2 Claims. (Cl. 206—65)

The present invention relates to a special method of packaging objects which are made from fragile materials and, while it is not necesarily limited to any specific material, it has been developed for the shipment of objects made from foamed synthetic resins which are economically made in large blocks. Specifically, the material employed by the applicant is a foam made from phenolic resins such as phenol-formaldehyde resins. Urea-formaldehyde resins and styrene resins may also be employed.

It has become quite popular to make all sorts of decorative devices and novelties out of these foamed resins, such as Christmas novelties, and Valentine and Easter novelties, but owing to the fact that the objects are very fragile, and difficult and costly to pack for safe shipment, the use of these materials has been limited. It is unecomonical to pack the articles because they are easily broken or damaged in handling and have to be protected with great care from injury during transportation.

What the invention proposes is to cut the articles out of blocks or strips of the material and leave the residue intact and surrounding the articles, so as to afford a protective shield or packing for them. This eliminates the expense of handling at the source, provides ample protection for the articles during transit, at no additional cost, and when received at the point of use, the waste material is stripped from the articles and thrown away.

The finished articles may take any desired form. In one set of views the article is shown as heart-shaped for the Valentine trade. In the other set of views is shown the manner in which decorative balls are cut out and shipped for the Christmas trade.

The foamed resinous material can be colored to suit the fancy, cuts easily, and is very attractive in appearance.

While the description and drawings are very detailed to enable the invention to be understood, it will be appreciated that changes and modifications may be made without departing from the principles of the invention as set forth in the claims hereof.

In the drawings:

Fig. 5 shows the manner in which balls are shipped.

Fig. 6 is an exploded view showing the balls separated from the waste material.

Referring to Figs. 1 to 4, inclusive, a block of the resin foam is indicated at 1 and the die at 2. The die is heart shaped and is provided with wings 3, here shown as four in number, by which the die may be passed through the block. When the die has passed completely through the block, the whole block may be immediately wrapped or placed into a carton or container, but in Fig. 3 tapes such as shown at 4 are passed around the block, which is now cut into six long strips.

In the center of the block and completely enclosed and protected by the waste pieces is the strip 5 of the material of the desired shape. This is a long heart-shaped (or other shaped) strip which is cut into short sections as required at the point of use, on the transverse lines 6. The protective pieces, after they have served their purpose, are thrown away. They are given the numerals 8, 9, 10, 11 and 12.

The number, shape and distribution of the waste pieces are subject to change, depending upon the design of the finished product.

Figure 1:
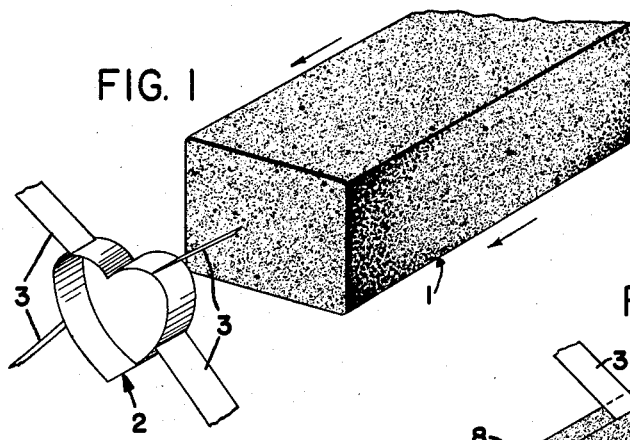
Fig. 1 shows a block of the resin foam and a heart-shaped cutting die.
Figure 2:
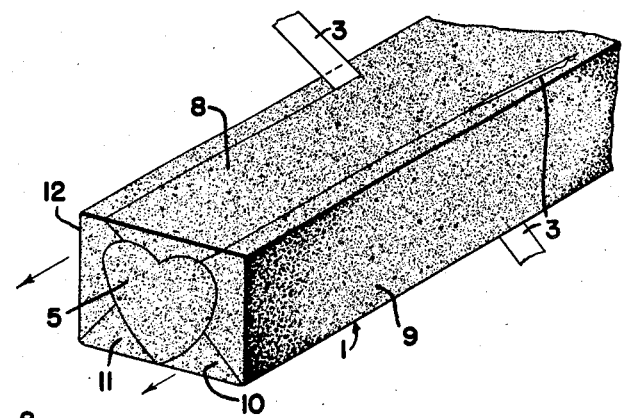
Fig. 2 shows the cutting process.
Figure 3:
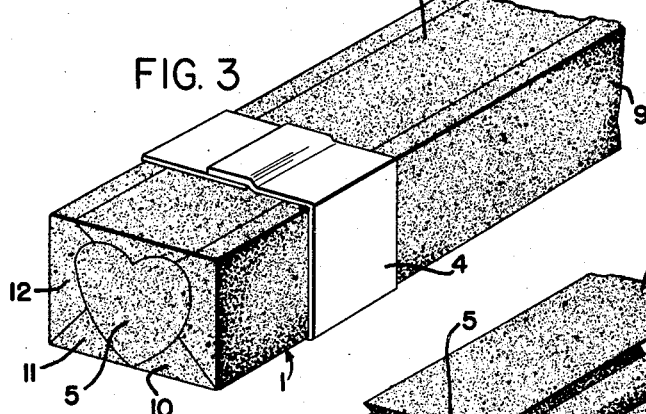
Fig. 3 is a view of the package ready for shipment.
Figure 4:
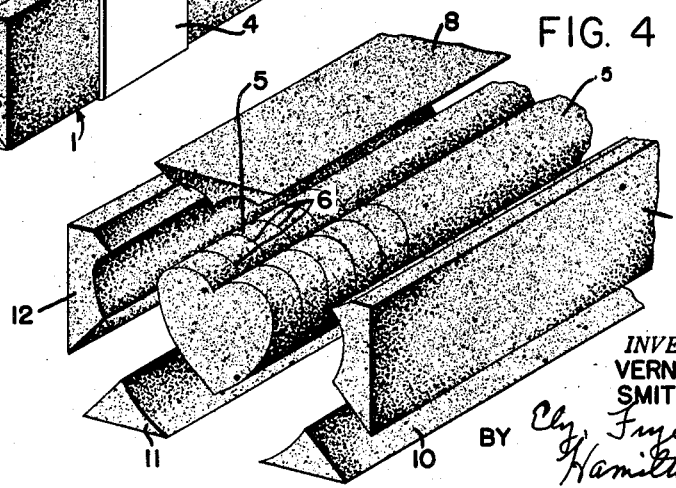
Fig. 4 is an exploded view showing the article separated from the protective waste material.
Figure 7:
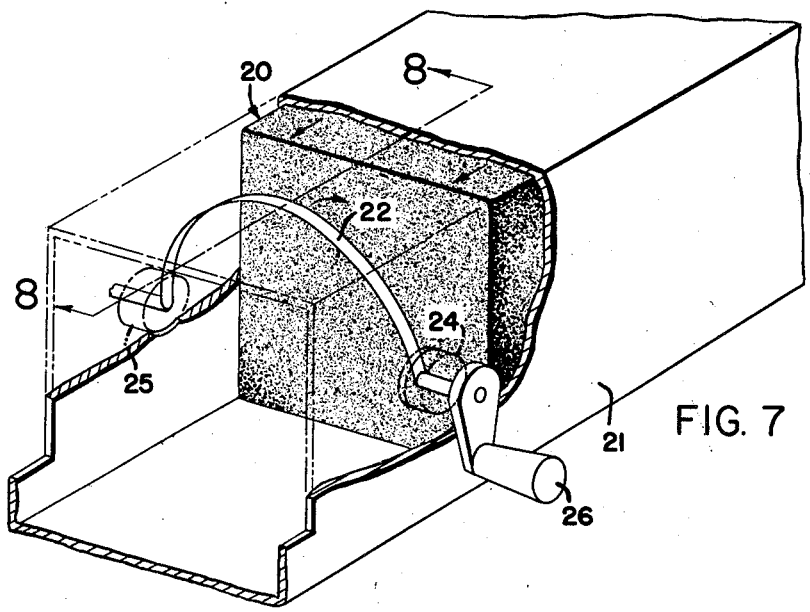
Fig. 7 is a view of a simple apparatus for cutting out the balls.
Figure 8:
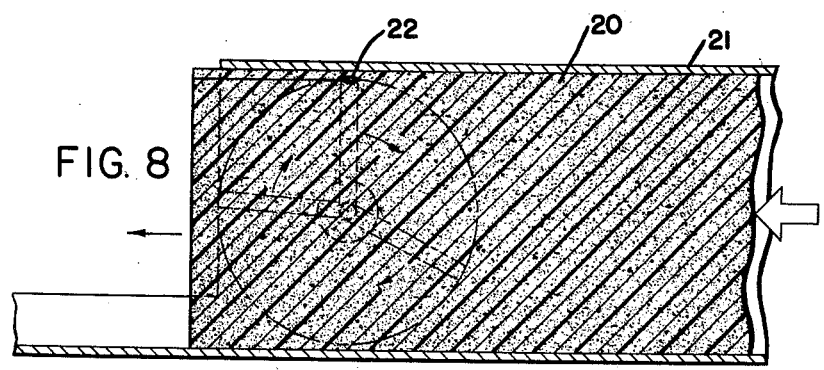
Fig. 8 is a section on the line 8—8 of Fig. 7 showing the cutting of the first ball.
Figure 9:
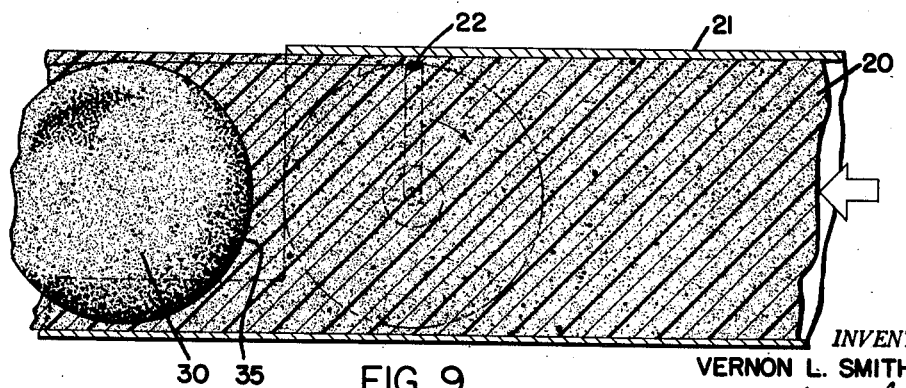
Fig. 9 shows the cutting of successive balls out of the one block of the material.

The cutting of bodies in the form of spheres or ovoids requires a somewhat different type of apparatus. As shown in Figs. 7 to 9, the block from which the articles are cut is given the numeral 20. A block is passed through a tunnel-shaped box 21 which closely fits the outside of the block. Located interiorly of the box is the knife 22, which, in order to cut spherical balls, is preferably semi-circular in form and is a narrow cutting blade which is mounted at its ends for rotation in the opposite walls of the casing, as at 24 and 25, respectively. Where the knife projects through one wall of the casing, it is provided with a crank 26 by which it may be rotated.

With the plane of the knife 22 vertical either at the top or bottom of its orbit, the block of foam is forced through the box 21 until the knife is in approximately the position shown in Fig. 8. This will produce a semi-circular cut through the block. The block is held in position and the knife rotated 360°, which will complete the cutting out of the first ball. While the knife is held stationary, the block is now moved to the next cutting point and the rotation of the knife is repeated, the operation being carried on until all possible cuts have been made in the block, whereupon the block is ejected from the box and the finished article wrapped or placed in a container, or as shown in Fig. 5, tapes 28 are applied to the block.

The finished balls are indicated by the reference numeral 30. They are enclosed in a sort of matrix which, when a semi-circular knife is used, comprises a strip 31 with a trough 32 which is semi-circular in cross section. The other section of the matrix is a strip 34 with a flat base and vertical sides which extend to the line of the knife bearings. Above the line the block is semi-circular to fit the trough 32. In the interior of the strip 34 are the series of spherical cavities 35 which house the balls 30. At each point where the knife was located when a ball was being cut out, there will be a transverse slot 36 extending around the dome-shaped top of the strip 34.

The waste material forms an adequate packing material for the finished balls, and a convenient means for shipping them. The protective covering is waste material and hence is of no expense whatever.

If a circular knife were used, there would be two trough-shaped pieces similar to the piece 31 and the balance of the matrix would be subdivided into separate pieces instead of remaining as a single strip. The objects may be spheres, ovoids, or any shapes generated by a cutting blade rotatable upon an axis transverse to the original block. Where the term "ball" is used in the specification or claims, it is intended to cover all such objects.

What is claimed is:

1. As a special package an oblong block of resinous foam material comprising, a medial portion extending longitudinally of said block having at least one ball-shaped object cut from the interior thereof, a severed and separable dome-shaped top portion extending longitudinally of said object throughout the length of said medial portion, and removable means for holding said object and portions together in block form.

2. As a special package an oblong block of resinous foam material comprising, a medial portion extending longitudinally of said block and having a series of ball-shaped objects cut from the interior thereof, the remainder of said medial portion having a series of cavities to receive said ball-shaped objects, a severed and separable dome-shaped top portion extending longitudinally of said objects throughout the length of said medial portion, and removable means for holding said objects and portions together in block form.

References Cited in the file of this patent

UNITED STATES PATENTS

| | | |
|---|---|---|
| 343,516 | Collins et al. | June 8, 1886 |
| 1,328,921 | Howe | Jan. 27, 1920 |
| 1,453,071 | Kleeman | Apr. 24, 1923 |
| 1,842,456 | Mackenzie | Jan. 26, 1932 |
| 1,908,940 | Weidel | May 16, 1933 |
| 2,516,124 | Kishibay | July 25, 1950 |

FOREIGN PATENTS

| | | |
|---|---|---|
| 244,016 | Great Britain | Dec. 10, 1925 |